April 21, 1964   M. T. HARVEY ETAL   3,130,172
COMPOSITIONS OF MATTER AND METHOD AND STEPS
OF MAKING AND USING THE SAME
Filed Dec. 1, 1958

INVENTOR.
MORTIMER T HARVEY AND
PETER L. ROSAMILIA
BY Angelo G. Pisarra
ATTORNEY _United States Patent Office_ 3,130,172
Patented Apr. 21, 1964

3,130,172
COMPOSITIONS OF MATTER AND METHOD AND STEPS OF MAKING AND USING THE SAME
Mortimer T. Harvey, South Orange, and Peter L. Rosamilia, Newark, N.J., assignors to Harvel Research Corporation, a corporation of New Jersey
Filed Dec. 1, 1958, Ser. No. 777,815
4 Claims. (Cl. 260—6)

This invention is directed to novel articles of manufacture and to methods for producing them. In one of its more specific aspects the invention concerns friction elements. These elements may be in the form of plugs, flat annuli, arcuate bands or the like which may be coupled with a support therefor, which may be part of a vehicle such as an automobile, airplane or the like. These friction elements serve as clutch facings and brake bands.

Clutch facings and brake linings are of curvilinear shape, and have a widthwise dimension greater than their thickness. Generally the clutch facing is in the nature of an annular band and the brake lining is generally in the nature of a plurality of arcuate bands. The clutch facing is mounted on a rotatable support while the brake linings are mounted on a brake band. In either case the friction elements may be secured to their support by rivets, adhesives, etc.

Prior to this invention, it was proposed to employ furfural-ketone reaction products in such friction elements. Such reaction products are water insoluble, and if they are to be used as binders, the asbestos being alkaline requires that it first be acid washed because they require acid conditions for proper conversion to the infusible state.

We have discovered that improved friction elements for certain purposes may be obtained by using water soluble acetone-formaldehyde reaction products, thus eliminating the requirement of expensive solvents, said acetone-formaldehyde reaction products being capable of being converted to the solid and infusible state under alkaline conditions, thus eliminating the necessity of acid washing. In addition, by employing acetone-formaldehyde reaction products the cost of the friction element is reduced and such elements have high frictional characteristics when compared with those in which furfural-ketone reaction products are used.

Novel and highly useful friction elements which we produce according to this invention comprise essentially asbestos and a water soluble thermosetting acetone-formaldehyde resin converted to the infusible state, with said resin preferably produced by reacting under alkaline conditions 1 mole of acetone with at least 2 and up to 5 moles of formaldehyde. They may also include a friction fortifying material as well as any other materials that may be found suitable for the performance desired. While these novel friction elements may be produced by a variety of methods, a number of examples are hereinafter set forth merely for the purpose of illustration. In general, the asbestos may be coupled with the resin in the ratio by weight of the asbestos to the resin being in the range of 9–10 to 60–40.

The acetone-formaldehyde resin either modified or unmodified may be combined with the asbestos to provide clutch facings and brake linings having a variety of characteristics. These resins may be employed as saturants and binders, binders for the asbestos and also imparts good frictional properties to such clutch facings and brake linings. Some of the various materials which may be employed as modifying agents are (a) water soluble materials, which may be employed alone or in combination of two or more of them as additive modifiers and are: resorcinol, water soluble phenol-aldehyde organic reaction products, water soluble urea-formaldehyde organic reaction products, water soluble lignin, water soluble glue, water soluble zein, water soluble polyvinyl alcohol and pinewood resins or pitches, which are known on the market as "Vinsol" and converted to the water soluble state by alkali treatment as known to the art. "Vinsol," in general, is pine wood extract which is at least 75% insoluble in gasoline, at least 90% insoluble in petroleum ether, has a methoxy content of at least 3%, melting point of approximately 200–260° F. and saponification number of approximately 120–150 and (b) water insoluble compositions which may also be employed alone or in combination of two or more of them and if desired in combination with one or more of said water soluble compositions are the following additive modifiers: such as anacardic material, which may be cashew nut shell liquid, acid and/or heat polymerized cashew nut shell liquid, residues of cashew nut shell liquid produced by distilling cashew nut shell liquid until the quantity of residue measures by weight 25%–75% of the cashew nut shell liquid distilled either at atmospheric or under reduced pressure conditions; polymerized residues of cashew nut shell liquid, cardanol; polymerized cardanol; aldehyde reaction products of all the aforementioned anacardic materials, said anacardic materials and their aldehyde resinous reaction products being in the liquid or solid state when added to the acetone-formaldehyde reaction product before curing; phenol; water insoluble liquid phenol-aldehyde resins; normally solid polymers and copolymers of vinyl esters, such as vinyl chloride and vinyl acetate; normally solid polyvinyl acetals such as polyvinyl butyral, polyvinyl formal and polyvinyl acetal; rubbery compositions such as natural rubber, reclaimed rubber; rubbery polymers of chloroprene; rubbery copolymers of butadiene and acrylonitrile; water insoluble organic reaction products of ketones such as methyl ethyl ketone, mesityl oxide, diacetone alcohol, methyl diisopropyl ketone and an aldehyde such as formaldehyde under alkaline conditions. If desired these various water insoluble additives may be in the form of emulsions when first added to the acetone-formaldehyde resin.

These water insoluble ketone-aldehyde resins may be produced in the following general manner:

*Example X*

About 280 parts of methylethyl ketone, 680 parts of a 37% aqueous solution of formaldehyde and 12 parts of NaOH in 24 parts of water were charged into a reaction vessel and brought to boiling under a reflux condenser and maintained in that state for about 1 hour. Then the mass was dehydrated at 120° C. to obtain 378 parts of light colored liquid resin insoluble in water, soluble in alcohol and having a viscosity of 700–1000 centipoises at 250° C.

*Example Y*

Following the same procedure as that set forth in Example X, but using, instead of methylethyl ketone, equimolecular proportions of either mesityl oxide, diacetone alcohol or methyl di-isopropyl ketone, there are produced other water insoluble and alcohol soluble ketone-aldehyde resins.

These ketone-aldehyde resins of Examples X and Y are particularly suitable for increasing the friction value when used as modifying additives herein.

These modifying additives whether water soluble or water insoluble either alone or in combination with each other are preferably employed in the proportion of 1–25 of additive to 75 parts of the water soluble acetone-formaldehyde resin.

Figure 1:
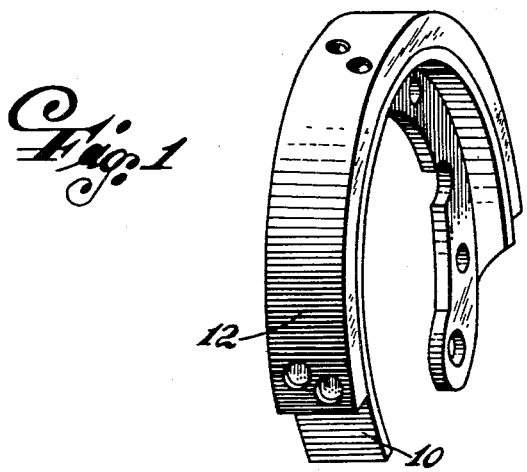
FIG. 1 is a perspective view illustrating a brake band carrying a brake lining.
Figure 2:
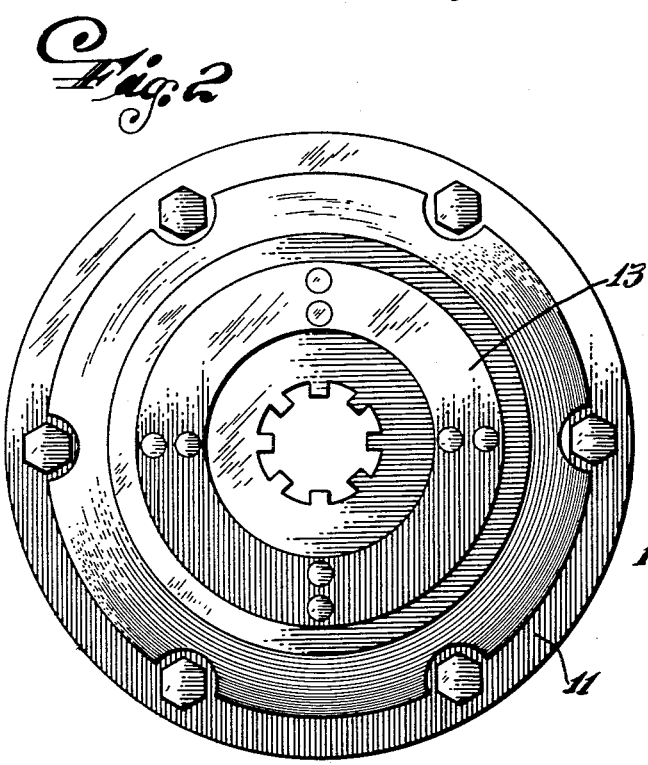
FIG. 2 is a front view of a clutch plate drive carrying a clutch facing.
Figure 3:
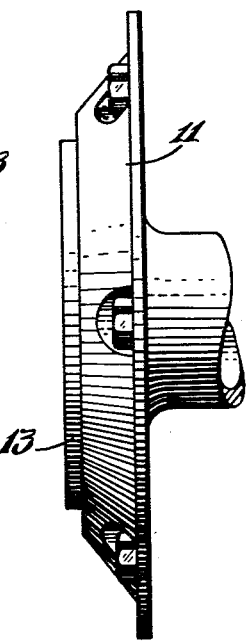
FIG. 3 is a side view of that shown in FIG. 2.

As shown in FIGS. 1 and 2 there are shown a brake band 10 and a constant drive element 11 respectively. Carried by the members 10 and 11 are friction elements 12 and 13 which respectively are brake band and clutch facing. These members 12 and 13 are arcuate shape and in each case have a widthwise dimension less than the length and greater than the thickness thereof. These frictional elements may be produced in a variety of different manners and may be produced by the same general methods. Therefore we shall describe their production more particularly with reference to the brake linings or bands 12.

The acetone-formaldehyde resins employed in the making of the novel friction elements are readily and easily produced by reacting under alkaline conditions acetone and formaldehyde in the mole proportions of 1 mole of acetone to 2-5 moles of formaldehyde, examples of which are hereinafter set forth merely for the purpose of illustration. The alkaline catalyst employed are preferably the strongly alkaline agents, such as sodium hydroxide, potassium hydroxide, calcium hydroxide, potassium carbonate, sodium carbonate, etc.

Instead of using said inorganic alkaline catalysts, we may employ a tertiary amine as the catalyst. The tertiary amines employed are those compounds containing at least one tertiary nitrogen and may or may not contain one or more additional nitrogen which may be either primary, secondary and/or tertiary. The tertiary amines which are preferably employed are those in which the tertiary nitrogen has at least one aliphatic radical attached directly thereto, and, more preferably, tertiary amines which when added to water in equal parts by weight, such solutions at 70° F. have a pH greater than 7 and generally at least about 8.5 and in most cases about 8.5 to 13.5. Examples of some of said tertiary amines employed in the practice of this invention and given merely by way of illustration and not limitation are trimethyl amine, triethyl amine, tripropyl amine, tributyl amine, triethylene diamine, diethyl amino propyl amine, dimethyl amino propyl amine, and methyl benzyl dimethyl amine.

Since all of the commercially available formaldehyde has a pH value materially less than 7 and since the tertiary amines are relatively expensive, we may first add to the acetone-formaldehyde mix which is to be reacted, a quantity of a cheap reagent such as any of said inorganic alkalis to neutralize the acidic component of the commercial formaldehyde therein or to increase the pH of the mix to at least 7 and for most purposes in the range of 7-7.5 after which a quantity of the desired tertiary amine may be added thereto to promote the reaction and obtain high yields of resinous acetone-formaldehyde reaction products.

Also, if desired, a combination of one or more of said tertiary amines and one or more of said alkalis, either weak or strong may be employed together as the coupling agent or catalyst in the production of the acetone-formaldehyde resinous organic reaction products. When such combinations are employed, it is preferable that the proportion of alkali employed be less than that which if employed alone, would tend to or would cause such reaction products to be converted to the solid or infusible state in the course of reaction or dehydration thereof.

Also, the reaction of acetone and formaldehyde may be conducted in the presence of the weak or strong alkali catalysts, with the proportion of such alkalis again being such that reaction between the acetone and formaldehyde may take place but less than such that the acetone-aldehyde reaction products will be converted to the solid and infusible state in the course of reaction or dehydration thereof. Then to said mass may be added a tertiary amine and such mass may be maintained at elevated temperature and thereafter the mass may be dehydrated under vacuum or atmospheric pressure and elevated temperature to provide high yields of water soluble substantially anhydrous reaction products which are liquid and resinous.

These resins are water soluble and are capable of being heat converted to the infusible state on either the neutral, alkaline or acid side.

*Example A*

(1 mole acetone-4 moles of formaldehyde)

300 parts acetone
1700 parts formaldehyde (37% concentration)
25 parts NaOH in
60 parts water The caustic soda-water solution was divided into four equal portions. The unit was loaded with the acetone and formaldehyde with the steam on and stirring equipment in operation and the material was heated to 120-125° F. The first portion of caustic soda-water solution was added and the steam cut off. As the temperature rises to 130° F. and the cold water is turned on, an exothermic reaction takes place and the temperature slowly rises to 200° F. then slowly begins to fall. At 185° F. the second portion of caustic soda-water solution is added whereupon the temperature again rises to 200° F. Upon cooling to 185° F. the procedure is repeated allowing the temperature to rise and fall between the additions of caustic soda-water solution and keeping the cold water on the jacket at all times. The mass is then allowed to cool to 145° F. at which time the cold water is shut off. Vacuum is turned on keeping the vent open. The vent is slowly closed and the steam turned on. Dehydration may be continued to produce a resin of 75%-100% "solids." The amount of resin produced measured more than 75% of the combined weights of the acetone and formaldehyde in the original charge. The resin, hereinafter known as Product A, was amber colored, is stable for at least 6 months at 30° C., cures in two hours at 140° C.; cures within four hours upon adding 5% lime thereto and cures within 2½ hours upon adding 10% lime thereto it will cure in 60, 10 and 3-5 minutes respectively at temperatures of 140° F.

*Example B*

(1 mole of acetone-3 moles of formaldehyde)

30 parts of acetone
126 parts of formaldehyde (37% concentration)
2 parts of NaOH in
4 parts of water The caustic soda-solution was divided into three equal portions. Using the same procedure as that set forth in Example A, the resultant resinous product produced was amber colored and measured more than 75% of the combined weights of acetone and formaldehyde in the original charge. The resin hereinafter known as Product B was soluble in water in up to 200% dilution and insoluble in 600% dilutions in water. Said Product B is further characterized as follows: 50 parts of this resin, Product B, mixed with 5 parts of lime was converted to the solid state at room temperature after about ½ hour which on standing becomes hard, firm, infusible and insoluble in acetone, petroleum spirits, aromatic spirits and chlorinated solvents, also unaffected by alkalis and dilute acids.

*Example C*

(1 mole of acetone-5 moles of formaldehyde)

30 parts of acetone
212 parts of formaldehyde (37% concentration)
2 parts of NaOH in
8 parts of water Employing the same procedure as that set forth in Example A, except that after the last addition of caustic soda-water solution and subsequent drop in temperature following the last exothermic reaction, the entire mass is heated to boiling under a reflux condenser for approximately 15 minutes. The quantity of free formaldehyde in the mass is determined and found to be 5.2% of the amount of formaldehyde in the original charge. Upon dehydration at 210° F. in the manner heretofore indicated, the resultant substantially anhydrous resin hereinafter known as Product C was an amber colored viscous mass infinitely soluble in water and measuring more than 75% of the combined weight of acetone and formaldehyde in the original charge.

*Example D*

1700 parts of aqueous solution of formaldehyde (37%)
600 parts of acetone
25 parts of triethylamine The three components are mixed together and warmed gently to accelerate the exothermic reaction which ensues and is allowed to continue under a reflux condenser after the external source of heat has been removed. When exothermic reaction subsides, external heat is again applied to maintain the mass in the state of boiling under the condenser for ½ hour. The condenser is then removed and the mass is heated to about 130° C. to dehydrate. The resultant substantially anhydrous acetone-formaldehyde liquid reaction product is of a resinous nature, is straw colored, is water-soluble and hereinafter known as Product D and measured about 950 parts containing 0.75% nitrogen.

*Example E*

Employing the same components in the respective amounts set forth in Example D and employing the procedure as therein set forth except that the acid number of the formaldehyde solution has first been ascertained and then sufficient sodium carbonate is added thereto to reduce the acid number thereof to zero. The resultant substantially anhydrous acetone-formaldehyde liquid reaction product is of a resinous nature, is straw colored, is water-soluble and is hereinafter known as Product E and measured about 950 parts.

*Example F*

To 1700 parts of aqueous solution of formaldehyde (37%) is added a solution of 315 parts of acetone together with 25 parts of triethylamine. Under reflux condenser the mass is warmed gently to accelerate the exothermic reaction. After the exothermic reaction has subsided, a solution of 315 parts of acetone together with 25 parts of triethylamine is added thereto. By the use of external heat the mass is maintained in the state of boiling under said condenser for 30 minutes. Then the mass is heated to about 130° C. to substantially completely dehydrate it. The yield is 973 parts of substantially anhydrous liquid acetone-formaldehyde reaction product which is of a resinous nature, is water-soluble, is straw color, and is hereinafter known as Product F.

*Example G*

510 parts of aqueous solution of formaldehyde (37%)
360 parts of acetone
75 parts of diethylamine propyl amine The above components were mixed and placed under a reflux condenser and allowed to stand at room temperature (70° F.) whereupon an exothermic reaction occurred and the temperature of the mass reached 76° C. The mass was allowed to react for about 1½ hours, the condenser removed and then the mass was maintained, under reduced pressure of 70 mm. of mercury pressure, at a temperature of 95° C. until it was substantially completely dehydrated. This yielded 342 parts of substantially anhydrous liquid acetone-formaldehyde reaction product which was of a resinous nature, was straw colored, was water-soluble and is hereinafter known as Product G.

*Example H*

510 parts of aqueous solution of formaldehyde (37%)
180 parts of acetone
75 parts of diethyl amino propylamine Employing the same procedure as set forth in Example G, there was obtained a yield of 325 parts of substantially anhydrous liquid acetone-formaldehyde reaction product which is of a resinous nature, is straw colored, is water-soluble and is hereinafter known as Product H.

*Example I*

170 parts of aqueous solution of formaldehyde (37%)
60 parts of acetone
0.5 part of diethyl amino propyl amine The above components were mixed and placed under a reflux condenser. The pH of the mix was determined and found to be about 9. The mix was heated gently to accelerate the speed of the exothermic reaction. When the exothermic reaction had subsided, the mass was maintained in the state of boiling for ½ hour. Then the condenser was removed and the mass dehydrated under vacuum at about 70 mm. of mercury pressure and a temperature of about 90–95° C. to obtain a liquid substantially anhydrous acetone-formaldehyde reaction product which was of a resinous nature, water-soluble and straw colored and is hereinafter known as Product I.

*Examples J–L*

Using the same two components of Example I in the same amounts as therein set forth and also the third component, except that the third component is present in the following respective amounts: 1 part in one case, 5 parts in another and 25 parts in the third and using the method set forth in Example I, there were obtained liquid substantially anhydrous acetone-formaldehyde reaction products all of which were of a resinous nature, straw colored, water-soluble and are hereinafter respectively known as Products J, K and L. The pH of Products J, K and L were determined and found to be respectively 8.5, 9.5 and 10.5. Such determinations were made on aqueous solution of said respective products dissolved in 4 times their weight of water.

*Example M*

170 parts of aqueous solution of formaldehyde (37%)
60 parts of acetone
1 part of triethylamine The components are charged into a stainless steel autoclave and heated to raise the pressure therein to 100 lbs. per sq. in. and the mass was so maintained for 1 hour. The source of heat was removed and then the mass was dehydrated at 95° C. under 40 mm. of mercury pressure to obtain a yield of 82 parts of anhydrous liquid acetone-formaldehyde reaction product of a resinous nature, which is stable and water soluble and is known hereinafter as Product M.

*Example N*

170 parts of aqueous solution of formaldehyde (37%)
30 parts of acetone
25 parts of triethylamine Employing the same procedure as that set forth in Example D there was obtained a substantially anhydrous acetone-formaldehyde liquid reaction product which was of a resinous nature, water-soluble and is hereinafter known as Product N, measuring about 95 parts.

*Example O*

25 parts of aqueous solution of formaldehyde (37%)
30 parts of paraformaldehyde
60 parts of acetone
25 parts of triethylamine The four components are mixed together under a reflux condenser and warmed gently to increase the speed of exothermic reaction which proceeds and the temperature of the mass goes to about 165° F. After it has subsided, the mass is maintained in the state of boiling under the reflux condenser for about 1 hour. The condenser is removed and the mass is heated to about 130° C. to dehydrate and the resultant product is a substantially anhydrous, water-soluble, liquid reaction product, hereinafter known as Product O weighing about 85 parts.

*Example P*

60 parts of acetone
1.2 parts K$_2$CO$_3$ dissolved in 2.5 parts of water
340 parts of aqueous solution of formaldehyde (37%)

were charged into a reacting unit having a reflux condenser and mixed together. External heat was applied until the temperature of the mass reached 145° F. External heat was removed because the exothermic reaction started and continued. The temperature rose to 165° F. The reaction was allowed to continue for 15 minutes and the temperature began to drop. The mass was cooled to about 140° F. and at this stage 60 parts of acetone and 5 parts of triethyl amine are added. Heat was applied to maintain the mass in the state of boiling under the condenser for ½ hour. The condenser was removed and the mass maintained at 225° F. to partially dehydrate and provide an 80% aqueous solution of the acetone-formaldehyde reaction product hereinafter known as Product P. The viscosity of said solution at 25° C. was 2440 cp., the specific gravity 1.205 at 25° C. and the Index of Refraction 1.4875 at 25° C.

*Example Q*

340 parts of aqueous solution of formaldehyde (37%)
60 parts of acetone
2 parts of diethyl amino propyl amine were charged into a reacting vessel having a reflux condenser. The mass was stirred and external heat applied to hasten the exothermic reaction. The temperature rose to 175% F. and remained at that temperature for about 15 minutes. Then the mass was cooled to 140° F. and 60 parts of acetone and 12 parts of diethyl amino propyl amine were added. Again an exothermic reaction set in and the temperature rose to 165° F. At this stage, external heat was applied and the mass was maintained in the state of boiling for ½ hour. The condenser was removed and the mass was maintained at 225° F. to dehydrate to provide an 80% aqueous solution of resinous acetone-formaldehyde reaction product known hereinafter as product Q which solution at 25° C. had the following characteristics; viscosity 1670 cp., specific gravity: 1.215, and Index of Refraction 1.4818.

*Example R*

1700 parts of aqueous solution of formaldehyde (37%)
315 parts of acetone were mixed together and then there were added thereto:

12.5 parts of triethylamine

The reaction was allowed to take place and cooling provided so that the exothermic reaction is not too vigorous. When the exothermic reaction had subsided, a charge of 315 parts of acetone
12.5 parts of triethylamine was added to said mass with stirring and a second exothermic reaction was allowed to take place. Then after this reaction had subsided the mass was refluxed for 1½ hours, then dehydrated at elevated temperature to provide a water-soluble, substantially anhydrous resinous reaction product which is liquid and hereinafter known as Product R. To the liquid, dehydrated mass was added 300 parts of water and the temperature of the solution brought to 100° F. to which was added 50 parts of ammonium hydroxide. This will give about 70% solids and will cure in 3 minutes at 500° F. on glass wool to become water insoluble and a strong binder. The following examples are given merely by way of illustrating the various methods which may be employed to provide the friction elements 12 and 13.

*Example 1*

60 parts asbestos flock or fibers, 10 parts of barytes, 5 parts of lime and about 25 parts of Product A dissolved in 10–20 parts of water are charged into a dough mixer. This mass is mixed therein until a substantially homogeneous mix is obtained. Then the homogeneous mix is extruded and shaped into rough elongated band or ribbon form. The wet shaped band or ribbon is cut into strips of required length and these strips are dried at room or elevated temperature to remove the water therefrom. Then they are cold pressed to the arcuate form and oven cured at gradually increasing temperatures of 150–350° F. over about a 24 hour period. At the end of that time, they are removed from the oven and are in the form shown in FIG. 1 and are dense, hard and substantially homogeneous and now contain the Product A which has been converted to the solid and infusible state and serves as an excellent binder and impart good frictional properties to the lining 12 which may be coupled with the supporting band 10 of an automobile of the like by rivets and/or by being adhesively secured thereto. The adhesive which may be employed may be the acetone-formaldehyde resin either modified or unmodified with the compositions heretofore set forth, and may be applied as a film between lining 12 and brake band 10 after which while they are maintained under pressure, the assembly is maintained at about 300° F. for 6 hours whereupon the adhesive is converted to the solid and infusible state and serves to couple the lining 12 and band 10 securely to each other.

*Example 2*

A flat surface annulus or a ribbon of pressed or woven asbestos fibers is dried in an oven to expel air and moisture therefrom. Then it is immersed in an aqueous solution of Product A containing 60–70% by weight of said resin and allowed to remain therein for about 2 hours to become saturated with said solution. Then it is hung on a rack for draining of excess solution for about 2 hours and subsequently dried and cured in an oven at gradually increasing temperatures of 150–400° F. for 24 hours whereupon the water is driven off and the resin converted to the infusible state to provide element 12 or 13 which is tight, dense, hard, non-porous and tough and has good frictional and wear characteristics. If desired after the water has been expelled and before the resin has been completely cured, the partially cured stock may be pressed under high pressure to be rendered denser and then replaced in the oven for complete curing.

*Example 3*

Employ the same procedure and proportion of parts as set forth in Examples 1–2, except that in place of the Product A employed in Examples 1–2, there is employed a like quantity of a material 75–99% of which is Product A and the other 25–1% of which is one or a combination of two or more of the water insoluble additive or modifying agents hereinbefore set forth to provide a wide variety of friction elements.

*Example 4*

Product A, with or without one or more of the water insoluble modifiers in the proportion of 75–99 parts of Product A to 25–1 parts of said water insoluble modifiers are dissolved in water, if desired, and this solution is placed in shallow open pans and heated at 120° C. to drive off the water and then, with or without the addition of an acid or alkaline catalyst to throw it on the acid or alkaline side, is maintained in an oven for 16–24 hours at 300° F. whereupon the mass is converted to the solid state and the Product A component is in the infusible state. Then the solid mass is ground into a fine powder or dust and may be used as friction particles in friction elements.

Example 5

300 parts of Product A is mixed with 6 parts of lime to uniformly distribute the lime therethrough. Then the mass is heated to 160° C. and maintained at that temperature for 16 hours in shallow metal pans. Product A is thus converted into a hard, infusible resin having an acetone extract of less than 1% and a volatility characteristic that when a 5 gram sample was maintained at 700° F. for 2 hours it was 50%. The infusible resin is ground into a fine powder or dust.

Example 6

100 parts of Product A was intimately mixed with 3 parts of diethyl sulphate and cured in the same manner as Example 5, and had an acetone extract of .9% and a volatility characteristic of 37% when a 5 gram sample is maintained at 700° F. for 2 hours.

Example 7

One or more of the water insoluble modifiers hereinbefore set forth and in amount of 1–25 parts are mixed with 99–75 parts of Product A in substantially anhydrous condition. The modifiers employed in this example are preferably in the liquid state or plastic state or in thick emulsion form. After a homogeneous mix is obtained in a dough-mixer, the mass may be cut into small particles which are now dispersed in any desired manner in an organic solvent or the like to provide a slurry. The slurry is charged into a dough mixer having asbestos fibers therein measuring about 9 times the weight of the modified resin of said slurry charge. The mass is mixed until substantially homogeneous and then placed in a mold, pressed, dried and finally cured at temperatures up to 350° F. over a 12–24 hour period to convert the acetone-formaldehyde resin to the infusible state and to provide curvilinear friction element 12 or 13 which is dense and hard and having good frictional and wearing properties. If desired during the mixing of Product A and the water insoluble compositions before the slurry is made up, various reagents in the nature of catalysts, accelerators and vulcanizers may be added.

Example 8

Any desired latex of the required rubbery material or combination of rubbery materials hereinbefore identified, is mixed with a quantity of Product A which may be in the substantially anhydrous condition, and generally in the approximate ratio by weight of 2 parts of rubbery material to 1–4 parts of said resinous Product A. At this stage there may also be added during the mixings the desired quantities of accelerators and controllers of said rubbery material, which may be sulphur, zinc oxide, etc. After a homogeneous mix is obtained, the mass is cut into small particles which are then dispersed into a suitable organic solvent such as xylol to provide a slurry which is charged into a dough mixer having a charge of asbestos fibers therein measuring by weight about 1–9 times the weight of said resin in said slurry. The mass is mixed until substantially homogeneous and then is placed in a mold, pressed, dried and finally cured at temperatures up to 350° F. over a 12–24 hour period to provide a curvilinear dense and hard friction element 12 to 13 having good functional and wearing properties. In the curing step, Product A was converted to the solid infusible state.

Example 9

About 75–99 parts of Product A intimately and uniformly mixed with 25–1 part of one or more of said water insoluble composition. This mass is then cured at 300–350° F. for 16–24 hours to provide substantially solid material which may then be ground into a fine powder or dust and in which Product A component is in the infusible state. Before curing and during mixing we may add a catalyst to throw the mass to either the acid or alkaline side. We also may use various accelerators, vulcanizers, etc. dictated by the particular additives employed.

Example 10

70 parts of asbestos flock or fibers, 10 parts of a powder or dust of discrete particles, illustrative examples of which are prepared according to Examples 4, 5, 6 and 9 and 40 parts of phenol-aldehyde, cashew nut shell liquid-formaldehyde or polymerized cashew nut shell liquid-formaldehyde together with a curing catalyst are intimately mixed to provide a homogeneous composition which may be extruded, shaped, dried and cured at increasing temperatures up to 350° F. for 24 hours in the manner of Example 1 or may be molded, pressed, dried and cured in the manner of Example 2 to provide, improved hard and dense friction elements. In the finished friction elements, the powder or dust of Examples 4, 5, 6 and 9 employed herein appear as distinct and discrete particles throughout the binder and serve as friction fortifying or friction controlling and/or wear controlling agents.

Example 11

20 parts of Product A, 5 parts of a 50% emulsion of polyvinyl chloride, 70 parts of asbestos and 10 parts of an extremely finely divided material or dust produced by grinding infusible hard resinous reaction product of monomeric or polymeric cashew nut shell liquid and formaldehyde. All these components are mixed together to form a homogeneous composition which may be extruded, shaped, dried and cured or molded, pressed, dried and cured as set forth in Examples 1 and 2 to provide improved friction elements. In this instance the Product A is converted to the infusible state and acts as the primary binder while the dust is distributed fairly uniformly therethrough as discrete particles and acts as a friction fortifier.

Example 12

100 parts of polymerized cashew nut shell liquid, 4 parts of hexamethylene, 40 parts of Product A and 320 parts of asbestos flock or fiber are all mixed together to form a homogeneous mass which is then molded, pressed and cured in the manner of Example 1 or 2 to provide improved friction elements 12 and 13.

Example 13

Using the same procedure and components as set forth in Example 12, except that an additional component is employed, namely 10 parts of resorcinol, there may be provided a variation of the friction element 12 and 13.

Any of the other acetone-formaldehyde reaction products, such as the respective products B–R may be substituted for Product A in each of the foregoing Examples 1–13.

We have found that the water-soluble acetone-formaldehyde thermosetting resins either modified or unmodified with the additives hereinbefore set forth find utility in a wide variety of additional different fields. They may be used as bonding agents and binders for wood, glass, cotton, silk, rayon, paper, felt, metal, asbestos, stone, etc.

When it is desired to provide laminations, a cheap and convenient method is to mix together 5 parts of lime and 50 parts of the water soluble resin, such as Products A—R respectively. This mixture is spread on a base and the layer to be laminated therewith is placed on the resin and alkali mix and the combination may then be placed under pressure and so maintained at elevated temperature of about 150° F. or at room temperature for 20 hours and then allowed to remain undisturbed for 1 to 10 days to provide strongly bonded lamination. This procedure is of particular value in the production of wood on wood laminations and also in the bonding of asbestos clutch facings and brake linings to the metallic supports therefor.

They may be employed as cold setting casting resins by merely adding a sufficient amount of an alkaline substance such as lime thereto, pouring the mixture into a mold and allowing it to set at room temperature or if desired at elevated temperatures.

They may be mixed with various fillers which may be in the nature of a powdery material or a fibrous material in the form of wood, flour, sand, etc. or glass fibers, asbestos fibers, wood fibers or the like. To this mix is added a quantity of lime and then the resultant mass is made up in the desired shape and size and heat cured to provide dense, hard, impervious, water-proof and chemically-resistant vessels, conduits, etc.

They may be mixed with plaster of Paris or cement with or without a filler. The resultant mix may be molded to the proper shape and allowed to set at room temperature or at elevated temperatures.

They may be coated on freshly plastered or cemented walls, the plaster or cement aiding in the setting or curing of the resin. In such applications they act as sizers far superior to shellac, linseed oil, etc., on which painting with ordinary paints may be done. They may be used as bonding and binding agents in the abrasive field. They may be mixed with abrasive particles and lime. This mixture may be cured at elevated temperatures of 150–350° F. to provide strong abrasive wheels. They also may be employed in the production of other abrasive media such as the so-called sand papers or abrasive papers. For this purpose they may be mixed with lime in the proportion of 50 parts resin to 2–4 parts of lime. This mix may be spread on a paper or textile backing. Then on to the mix on the backing is sprinkled a quantity of sand or other abrasive particles which are imbedded therein. This is cured at temperatures up to 300° F. to provide a tough bonded sand paper. This may also be accomplished by first spreading the resin on the backing and then spreading a mixture of lime and with abrasive particles thereon and curing.

They may be employed as electric impregnating resins for coils such as those of transformers, motors and also as filling compounds and oil proof seals for cables. When so used they may be cured on either the acid, neutral or alkaline side at elevated temperatures or they may be cold setting and cured at room temperature by the addition of a sufficient quantity of alkali which may be at 5–10%, based on the quantity of resin employed.

They may also be employed as oil well plugs. For such a use a mixture of 100 parts of Portland cement and 70 parts of one of said resins in 30 parts of water may be employed.

The term "brake linings" as used in the present description and claims is meant to include not only such arcuate shaped element 12 but also friction elements known to the art as brake blocks and brake shoes, all of which serve as friction braking elements. They may be of different sizes and configurations, but in all cases are of curvilinear contour.

Other specific and preferred examples of this invention are those which are the same as Examples 1–13, except that instead of Product A, Products D–R respectively are substituted therefor in the same amount as Product A. The lime may or may not be omitted in Example 1, and it is preferable that it is not omitted, and in addition, there is charged into the dough mixer 3 parts of diethylene triamine whereby there is provided a brake lining superior to that in which Product A was employed. In Example 2, besides substituting any of said Products D–R in place of Product A, said solution may also contain a polyamino compound in amount equal to about 1–20% by weight of said solution and with or without lime in amount equal to about 3–8% of said solution whereby element 12 or 13 is provided.

In all of the aforesaid examples, it is preferable that besides substituting like amounts of Products D–R respectively for Product A therein, there is also used about 2–25 parts of any of said polyamino compounds.

While it is preferred to employ Products D–R in the practice of this invention, it is to be understood that any of the products, examples of which are Products A–R, may be used and it is preferable that they be cured by heating one or a combination of two or more of them in the mixture with one or a combination of two or more polyamino compounds, with each of them being two or more nitrogen-and-carbon containing compounds which is capable of reacting with any of said acetone-formaldehyde organic reaction products to provide substantially solid and substantially fusible organic reaction products having good oil and water resistance. Such nitrogen-and-carbon containing compounds preferably employed in the practice of this invention, are such compounds which are polyamino containing compounds and are capable of solution in an aqueous solution of the acetone-formaldehyde organic reaction product employed and in such system either with or without the presence of water, is capable of reaction with said acetone-formaldehyde reaction products to provide a heat-cured mass having good binding properties for the asbestos and having good frictional characteristics. Such polyamino compounds preferably employed in the practice of this invention are such carbon-and-nitrogen containing compounds characterized by containing at least 2 of any or at least any two of the following groups: —$NH_2$, —NH or —N—. That is, each polyamino containing compound has at least two of either a primary amino nitrogen containing group (—$NH_2$), a secondary amino nitrogen containing group (—NH) or a tertiary amino nitrogen containing group (—N—) or a combination of two or more of them.

The polyamino compounds preferably employed are those further characterized as follows: When a mixture consisting of 94 grams (1-gram mole) of hydroxybenzene and a number of grams of such polyamino compound equal to its molecular weight, divided by the number of amino group therein is heated to 150° C. and maintained at that temperature for 4 hours, at the end of that period the resultant mass is liquid at 150° C.; and more preferably those which are further characterized as follows: when 1 mole of polyamino compound and 2 moles of aqueous formaldehyde (37% conc.) are heated to 90° C. and maintained at that temperature for a period of about 10 minutes, at the end of that period the mass is water soluble.

Examples of such polyamino compounds, some of which are more effective than others, are ethylene diamine; phenylene diamine; propylene diamine; diethylamino propylamine; diethylene triamine; triethylene tetramine; dicyandiamide; 1,3,5-(dimethyl amino methane) phenol, known on the market as DMP–30; dimethyl amino propyl amine; isophthalyl dihydrazide; adipic acid dihydrazide; metaphenylene diamine; calcium cyanamide (when heated in the presence of water this compound hydrolyzes to provide calcium hydroxide and dicyandiamide as shown on page 278 of "Handbuch der Praparativen Chemie" 3te Auglage, 2 Organischer Teil (1937) by Vanino); toluene diisocyanate; diamino anisole; diamino anthraquinone; diamino azo benzene; diamino benzoic acid; diamino diphenyl; diamino diphenyl amine; diphenyl ethane; diphenyl ether; diphenyl methane; hydrazo benzene; diamino phenol; diamino phenyl acetic acid; p-chloro o-phenylene diamine; o-phenylene diamine; 4-isopropyl m-phenylene diamine; 2,4 toluene diamine; p,p methylene dianiline; dibutyl amino propyl amine; 3,3 imino bis propyl amine; N-N bis 1 methyl, actyl p-phenylene diamine; piperazine; pyrimidine; pyrozines; pyrezines; imidazoles; oxoazoles; azo benzene; diamino chloro benzene; diamino toluene; diamino nitrobenzene; diamino sulfonic acid; p-amino dimethyl aniline; dialkylamino ethyl-, propyl-, and butyl-amine; amino pyridine; p, amino benzene sulfonylamide; triamino azo benzene(Bismarck Brown); triamino benzene; triamino benzoic acid; triamino chlorobenzene; triamino phenol; triamino toluene; triamino triphenyl methane; triamino sulfonic acid; triamino nitro benzene; guanidine; phenyl dicyandiamide; benzo guanidine; malonamide; succinamide; Congo Red; etc.

This application is a continuation in part of our copending application Serial No. 238,267 filed July 24, 1951 and since abandoned and of our copending application Serial No. 516,376 filed June 20, 1955 and since abandoned.

Having thus described our invention, what we claim is:

1. In the method for producing a friction element, the steps comprising intimately combining asbestos, water soluble acetone-formaldehyde organic reaction product and a polyamino catalyst, shaping said combination into the form of an arcuate band and curing said band to convert said reaction product into the substantially water-insoluble solid and infusible state thereby to act as a binder for said asbestos.

2. In the method for producing a friction element, the steps comprising (I) intimately combining (a) asbestos, (b) an aqueous solution of water-soluble acetone-formaldehyde organic reaction product produced by reacting acetone and formaldehyde in the mole proportion of 1 mole of acetone to 2–5 moles of formaldehyde in the presence of an amine catalyst, and (c) a water-soluble compound which when in combination with said acetone-formaldehyde reaction product, such combination is capable of being converted to the substantially solid and infusible state upon being heated, (II) shaping said intimate combination of (a), (b) and (c) into the form of an arcuate band, (III) removing the water therefrom and (IV) heat curing said band to convert said combination of said acetone-formaldehyde reaction product and (c) into the substantially solid and infusible state said (c) selected from the group consisting of one and mixtures of at least two of the following: resorcinol, phenol-aldehyde organic reaction products, urea-formaldehyde organic reaction products, lignin, glue and pine wood extract at least 75% insoluble in gasoline, at least 90% insoluble in petroleum ether and have methoxy content of at least 3%, melting point of approximately 200°–260° F. and saponification number of approximately 120–150 and converted to the water soluble state by alkali treatment.

3. In the method for producing a friction element, the steps comprising (I) intimately combining (a) asbestos, (b) an aqueous solution of water-soluble acetone-formaldehyde organic reaction product produced by reacting acetone and formaldehyde in the mole proportion of 1 mole of acetone to 2–5 moles of formaldehyde in the presence of a catalyst and (c) a water-soluble polyamino compound which when in combination with said acetone-formaldehyde reaction product, such combination is capable of being heat converted to the substantially solid and infusible state, (II) shaping said intimate combination of (a), (b) and (c) into the form of a disc, (III) removing the water therefrom and (IV) heat curing said disc to convert said combination of said acetone-formaldehyde reaction product and (c) into the substantially water-insoluble solid and infusible state thereby to act as a binder for said asbestos.

4. In the method for producing a friction element, the steps comprising intimately admixing asbestos an aqueous solution of a water-soluble acetone-formaldehyde resinous reaction product, and an alkaline catalyst, forming said mixture into an arcuate band and heat curing said band thereby to convert said reaction product therein into the substantially water-insoluble and infusible state, thereby to act as a binder for said asbestos.

References Cited in the file of this patent

UNITED STATES PATENTS

| | | |
|---|---|---|
| 1,514,508 | Ellis | Nov. 4, 1924 |
| 1,899,239 | De Lukacsevics | Feb. 28, 1933 |
| 2,237,325 | Balz | Apr. 8, 1941 |
| 2,461,508 | Harvey | Feb. 15, 1949 |
| 2,570,389 | Schrimpe | Oct. 9, 1951 |